United States Patent
Grayson

(10) Patent No.: US 8,805,380 B2
(45) Date of Patent: Aug. 12, 2014

(54) SYSTEM AND METHOD FOR TUNING IN HETEROGENEOUS NETWORKS

(75) Inventor: Mark Grayson, Maidenhead (GB)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 13/372,976

(22) Filed: Feb. 14, 2012

(65) Prior Publication Data

US 2013/0210409 A1 Aug. 15, 2013

(51) Int. Cl.
*H04W 36/00* (2009.01)
*H04W 72/00* (2009.01)

(52) U.S. Cl.
USPC .......................................... 455/444; 455/453

(58) Field of Classification Search
USPC ............................ 455/444, 448, 449, 453, 454
See application file for complete search history.

(56) References Cited

U.S. PATENT DOCUMENTS

| | | | | |
|---|---|---|---|---|
| 5,956,642 | A * | 9/1999 | Larsson et al. | 455/449 |
| 7,974,230 | B1 * | 7/2011 | Talley et al. | 370/318 |
| 2003/0036387 | A1 * | 2/2003 | Kovacs et al. | 455/442 |
| 2009/0046665 | A1 * | 2/2009 | Robson et al. | 370/332 |
| 2010/0093358 | A1 * | 4/2010 | Cheong et al. | 455/444 |
| 2010/0151870 | A1 * | 6/2010 | Piercy et al. | 455/450 |
| 2010/0216485 | A1 * | 8/2010 | Hoole | 455/452.2 |
| 2011/0086665 | A1 * | 4/2011 | Nakamura | 455/522 |
| 2011/0130144 | A1 * | 6/2011 | Schein et al. | 455/442 |
| 2011/0244866 | A1 * | 10/2011 | Yamamoto et al. | 455/438 |
| 2011/0263261 | A1 * | 10/2011 | Vachhani et al. | 455/437 |
| 2011/0294493 | A1 * | 12/2011 | Nagaraja et al. | 455/422.1 |
| 2011/0300869 | A1 * | 12/2011 | Iwamura et al. | 455/436 |
| 2012/0039265 | A1 * | 2/2012 | Patel et al. | 370/329 |
| 2012/0094666 | A1 * | 4/2012 | Awoniyi et al. | 455/435.1 |
| 2012/0142392 | A1 * | 6/2012 | Patel et al. | 455/522 |
| 2012/0149377 | A1 * | 6/2012 | Su et al. | 455/438 |
| 2012/0258720 | A1 * | 10/2012 | Tinnakornsrisuphap et al. | 455/442 |
| 2013/0143555 | A1 * | 6/2013 | Singh et al. | 455/434 |

OTHER PUBLICATIONS

T. Kashima, et al., "Load Balancing Effect of Inter-Frequency Handover With Pilot Power Tuning in UTRAN," © 2004 IEEE, 5 pages.
3GPP Organizational Partners, "3$^{rd}$ Generation Partnership Project: Technical Specification Group Radio Access Network; UTRAN Iu interface Radio Access Network Application Part (RANAP) signalling (Release 10)," 3 GPP TS 25.413 V10.4.0 (Dec. 2011) © 2011, 428 pages.

* cited by examiner

*Primary Examiner* — Christopher M Brandt
(74) *Attorney, Agent, or Firm* — Patent Capital Group

(57) ABSTRACT

A method is provided in one example embodiment and includes receiving a radio related message including derived information for a particular cell in a heterogeneous network; and changing one or more self-optimizing network parameters of a small cell in the heterogeneous network to attract user equipment, where the change can be based on the derived information. In more specific embodiments, the derived information is provided in a relocation command message. In addition, the derived information can include cell load information for a macro cell. Certain methodologies may include receiving small cell derived information for a plurality of small cells in the heterogeneous network; and increasing a plurality of self-optimizing network parameters of the plurality of small cells in the heterogeneous network to attract a plurality of instances of user equipment, the increase can be based, at least, on information within Radio Access Network Application Part (RANAP) messages.

18 Claims, 7 Drawing Sheets

SYSTEM AND METHOD FOR TUNING IN HETEROGENEOUS NETWORKS

TECHNICAL FIELD

This disclosure relates in general to the field of communications and, more particularly, to a system and a method for tuning in heterogeneous networks.

BACKGROUND

Networking architectures have grown increasingly complex in communications environments, particularly mobile wireless environments. Wireless communication technologies are used in connection with many applications, including satellite communications systems, portable digital assistants (PDAs), laptop computers, mobile devices (e.g., cellular telephones, user equipment), etc. Wireless communication technologies are handling increasing amounts of data traffic volume, and the types of data being transported through mobile wireless networks have changed dramatically. This is in part because mobile devices are becoming more sophisticated and, further, are able to engage in more data-intensive activities such as displaying movies or playing video games. Video, file-sharing, and other types of usages (more traditionally associated with wired networks) have been gradually displacing voice as the dominant traffic in mobile wireless networks. Due to the increased traffic and the type of traffic on networks, there is a significant challenge for mobile operator providers to load balance or tune heterogeneous networks (i.e., overlapping networks).

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided in one example embodiment and includes receiving a radio related message containing derived information for a particular cell in a heterogeneous network. The information can include any suitable data segment or packet information to be used in changing certain parameters, as discussed herein. More specifically, the method can include changing one or more self-optimizing network parameters of a small cell in the heterogeneous network to attract user equipment, where the change can be based on the derived information. The self-optimizing network parameters can be changed can include any suitable characteristics associated with bandwidth, access, mobility, security, load, load balancing, power (e.g., transmission power, pilot power, etc.), tuning, frequency changes, or any other suitable configuration characteristic. Note that the term 'change' in such a context includes any suitable modification, altering, resetting, increasing, decreasing, zeroing, or otherwise adjusting from one level to another level.

In more specific embodiments, the derived information can be provided in a relocation command message. In addition, the derived information can contain cell load information for a macro cell. Certain methodologies may include receiving small cell derived information for a plurality of small cells in the heterogeneous network; and increasing a plurality of self-optimizing network parameters of the plurality of small cells in the heterogeneous network to attract a plurality of instances of user equipment, where the increase in the plurality of self-optimizing network parameters is based, at least, on information within Radio Access Network Application Part (RANAP) messages.

The method may also include averaging the derived information with previously received derived information to generate an average for a comparison to a threshold value. In a non-limiting implementation, the one or more self-optimizing network parameters is pilot power. In addition, for certain examples, the change to the one or more self-optimizing parameters is initiated by a small cell gateway. The method may also include determining a load associated with a particular small cell; comparing a congestion level of the particular small cell to a threshold value; and changing an attraction level associated with the particular small cell based on the comparing.

Example Embodiments

Figure 1A:
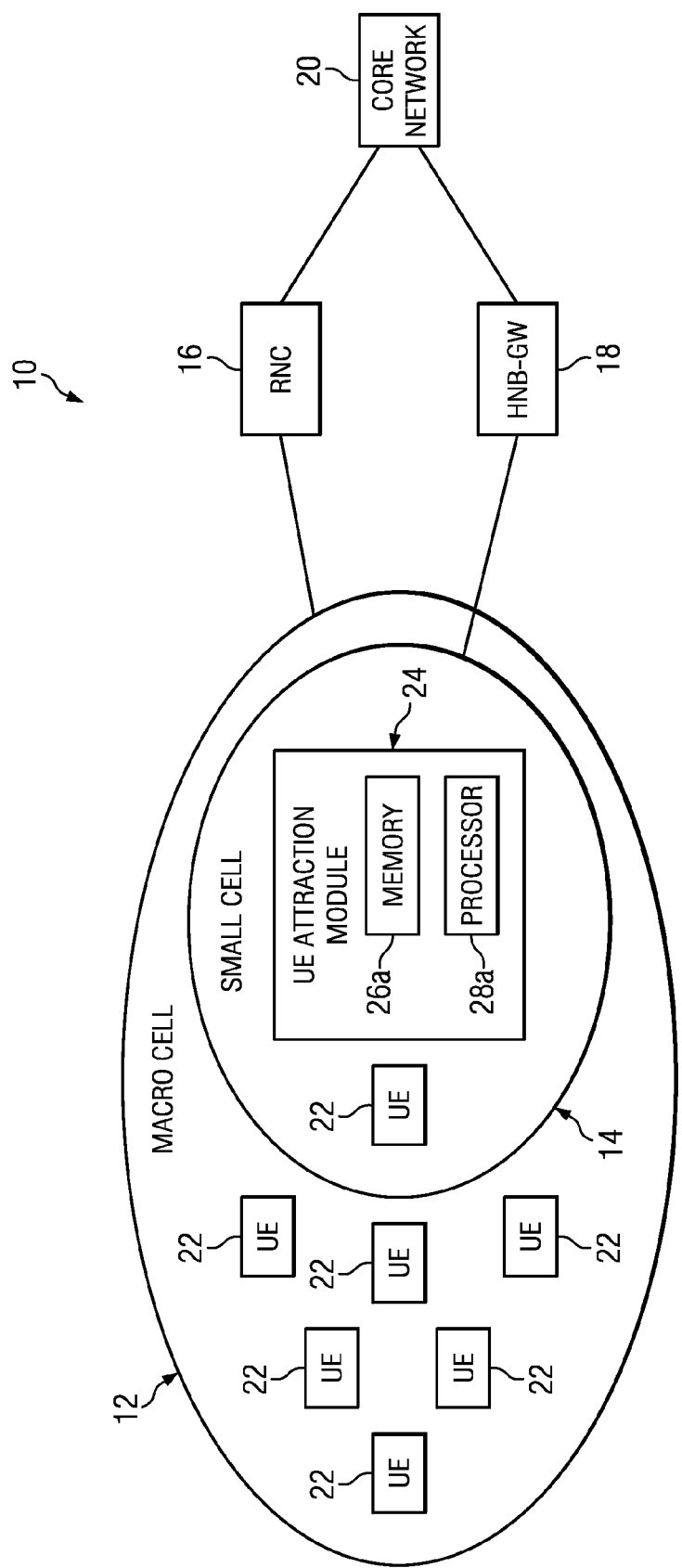
FIG. 1A is a simplified block diagram of a communication system for tuning in heterogeneous networks in accordance with one embodiment of the present disclosure.

Turning to FIG. 1A, FIG. 1A is a simplified block diagram of a communication system 10 configured for tuning in heterogeneous networks in accordance with one embodiment of the present disclosure. Communication system 10 may include a macro cell 12, a small cell 14, a Radio Network Controller (RNC) 16, a Home Node-B Gateway (HNB-GW) 18, a core network 20, and a plurality of instances of user equipment (UE) 22. Small cell 14 may include a UE attraction module 24, which may include a memory 26a and a processor 28a. Core network 20 may include Mobile Switching Centers (MSC), a Mobile Telephone Switching Office (MTSO), a Packet Data Network Gateway/Serving Gateway (PGW/SGW), etc.

In one particular instance, communication system 10 may be configured to use information derived from Radio Access Network Application Part (RANAP) messages to self-optimize the configuration of a small cell in a heterogeneous network. Communication system 10 offers a technique to increase the small cell radius to react to an overloaded macro cell. More specifically, communication system 10 may be configured to decode cell load information in a relocation request message. (The cell load can be measured as a ratio of total transmission power to the target transmission power.) The decoding may take place in the small cell itself, or in a small cell gateway such as an HNB-GW. If the cell load information passes a threshold (i.e., a network is overloaded), the small cell may be operable to effect self-optimizing network parameters in order to attract traffic (e.g., UEs) to the small cell. As a result, the traffic can be offloaded from the conventional macro cell in which the small cell is located. More specifically, UE attraction module 24 may be configured to receive RANAP derived information for macro cell 12 and/or small cell 14 and to increase or decrease the attractiveness of small cell 14 to balance the load of communication system 10. Logistically, if RANAP is proxied through a controller, then the proxied information can be used to proactively set the new small cell parameters.

Source cell load information (in a relocation required signal) and target cell load information (in a relocation request acknowledgment) can provide the load of overlapping cells, which may help determine whether more traffic needs to go to small cells, or whether traffic needs to be deflected to the macro cell. If the macro cell is lightly loaded, then the small cell may become less attractive and traffic may be pushed to the macro cell to balance the load on communication system 10. If the macro cell is heavily loaded (i.e., overloaded), then the small cell may become more attractive and take some of the traffic from the macro cell to balance the load on communication system 10.

Figure 1B:
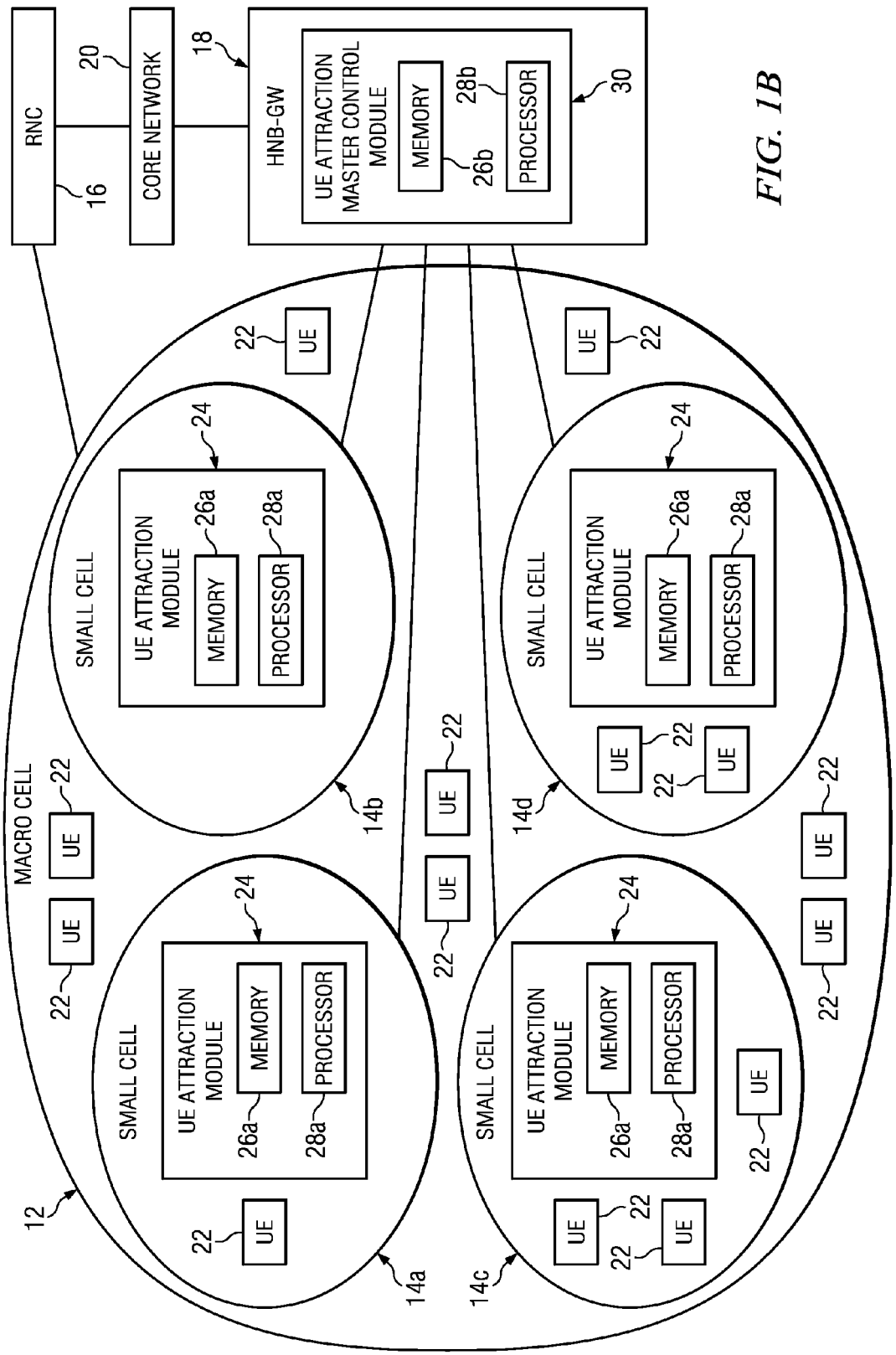
FIG. 1B is a simplified block diagram in accordance with another embodiment of the present disclosure.

Turning to FIG. 1B, FIG. 1B is a simplified block diagram illustrating one possible embodiment associated with communication system 10. This particular configuration may include macro cell 12, a plurality of small cells 14a-d, RNC 16, HNB-GW 18, core network 20, and UE 22. Each small cell 14a-d may include an instance of UE attraction module 24. HNB-GW 18 may include a UE attraction master control module 30. UE attraction master control module 30 may include a memory 26b and a processor 28b.

UE attraction master control module 30 can be configured to receive RANAP derived information for macro cell 12 and/or small cells 14a-d (e.g., from each UE attraction module 24 in small cells 14a-d), and to increase or decrease the attractiveness of each small cell 14a-d to balance the load on communication system 10. In one instance, small cell 14a may not have received any active hand-ins or handouts and, therefore, may not be able to derive the load of macro cell 12. However, because UE attraction master control module 30 in HNB-GW 18 may have received the load information from other small cells (i.e., small cells 14b-d), then the attractiveness of small cell 14a can be adjusted according to the load of macro cell 12 and/or small cells 14b-d to balance the load on communication system 10.

For purposes of illustrating certain example techniques of communication system 10, it is important to understand the communications that may be traversing the network. The following foundational information may be viewed as a basis from which the present disclosure may be properly explained. In many architectures, femtocells can be deployed as autonomous units to improve reception in areas with poor coverage, or within buildings where coverage is reduced by the structure itself. Wireless devices that are attached to (and in communication with) femtocells can have their data transmissions routed to the service provider's network (e.g., over the internet, over any suitable network, etc.). Thus, the access point (e.g., the femtocell) operates as a mini tower for the proximate user. However, the coverage provided by the access point is generally open to anyone within range: unless configurations operate to limit access to the network to only those individuals duly authorized for access.

Essentially, femtocells are fully featured (but low-power) wireless device base stations. Femtocells can be connected using standard broadband digital subscriber line (DSL) or cable service into the service provider's network. Femtocells offer excellent wireless device coverage at home for voice, data, etc., but at a lower cost than an arbitrary outdoor service. In operation, when in range of the femtocell (e.g., in a residential environment), a wireless device can automatically detect the femtocell, and subsequently use it (as a preference over outdoor cell sites). Calls can be made and received, where the signals are sent (potentially encrypted) from the femtocell via the broadband IP network to one of the mobile operator's main switching centers. Typically, femtocells operate at low radio power levels (e.g., less than cordless phones, WiFi, or many other household equipment). This can substantially increase battery life for wireless devices: both on standby and talk time. Additionally, because wireless devices are much closer to the femtocell, call quality is excellent and data devices can operate at full speed. Larger femtocell designs intended for business use (i.e., enterprise) can readily handle 8, 16, 32, etc. concurrent calls.

Hence, a wireless access point such as a microcell, picocell, femtocell, or other small cell base station, for example, is generally responsible for providing an air interface to a mobile endpoint. For example, some small cell network environments may include WiFi, WiMAX, and LTE strandmounted systems, which rely on a particular link over a particular infrastructure.

Common Pilot Indicator CHannel (CPICH) power tuning is a procedure for load balancing overlapping cells (i.e., tuning heterogeneous networks). However, the techniques assume that a common RNC controls all the overlapping cells and that vendor proprietary functionality can be used to control the load in the overlapping cells. Such proprietary techniques cannot be applied to heterogeneous networks, where one of the overlapping cells is parented to an HNB-GW (i.e., corresponds to a metro femto cell deployment). Therefore, a gap exists in functionality that macro vendors can utilize to force the use of the vendor's small cell offerings.

Many current architectures simply address the limited case where the cells are parented back to a common RNC. These architectures cannot address femto use cases, whereas the architecture of the present disclosure can leverage standardized RANAP messages to achieve automatic load balancing. One key to these activities is being able to manage dedicated resources for active users. The standardized directed retry capability supported in existing femto can be used for handling such overload conditions. The CPICH power tuning algorithms of the present disclosure can have the ability to sense such conditions and then update accordingly.

In accordance with one example implementation, communication system 10 can promote effective tuning in heterogeneous networks. In an example operation, a heterogeneous network may include a network that is operable to use information derived from RANAP messages to self-optimize the configuration of a small cell in the heterogeneous network. In an embodiment, cell load information appended to relocation messages may be used to tune the pilot power of cells in the heterogeneous network.

In more specific provisioning examples, a small cell can be operable to decode the cell load information in a relocation request message. The decoding may take place in the small cell itself or a small cell gateway. The load of the source cell (e.g. macro cell) may be averaged over a period of time with previously received cell load information. If the averaged information passes a threshold, the small cell may be operable to effect self-optimizing network parameters in order to attract more traffic to the small cell. As a result, the traffic can be offloaded from the conventional macro cell in which the small cell is located.

In operation, a self-organizing network (SON) operation can be used to change the pilot power tuning by increasing the pilot power when the load in the macro cell crosses a particular upper threshold, and by decreasing the pilot power when the load in the macro cell crosses a lower threshold. The cell load information may be information that is part of a hand-in operation from the small cell to the macro cell or that is part of a hand-out operation from the macro cell to the small cell.

3rd Generation Partnership Project (3GPP) Information Elements (IE) are typically used for communication in heterogeneous networks. Cell Load Information is a standard IE defined in 3GPP 25.413 for signaling the load in a source or target cell. The use of such an IE can be defined to allow a target cell to reject a relocation request (including the target cell load in a Relocation Reparation Failure message with a reject cause of "Traffic Load In The Target Cell Higher Than In The Source Cell") and, thus, can be used to obtain cell load information.

In addition, it should be noted that macro-small cell interaction can depend on the frequencies used. Separately, numerous parameters can be used in SON operations (e.g., backhaul BW as an input parameter). In certain example implementations, communication system 10 is configured to offer dynamic load control between femto and macro layer. In this one non-limiting embodiment, there can be an assumption that the backhaul BW will not vary dramatically over time.

Turning to the example infrastructure associated with present disclosure, each of the elements of FIGS. 1A-2B may couple to one another through simple interfaces (as illustrated) or through any other suitable connection (wired or wireless), which provides a viable pathway for network communications. Additionally, any one or more of these elements may be combined or removed from the architecture based on particular configuration needs. Communication system 10 may include transmission control protocol/Internet protocol (TCP/IP) communications for the transmission or reception of packets in a network, and may also operate in conjunction with a user datagram protocol/IP (UDP/IP) or any other suitable protocol where appropriate and based on particular needs.

Communication system 10 may be tied to a 3GPP Evolved Packet System, Long Term Evolution (LTE) architecture (including Evolved Packet System (EPS) and evolved Universal Mobile Telecommunications System (UMTS) Terrestrial Radio Access Network (eUTRAN) where the corollary to RANAP messages may be S1 Application Protocol (S1AP) or X2 Application Protocol (X2AP) messages) or alternatively this depicted architecture may be equally applicable to other environments. In general terms, 3GPP defines the EPS as specified in TS 23.401, TS.23.402, TS 23.203, etc. The EPS consists of IP access networks and an Evolved Packet Core (EPC).

Note that UE 22 can be associated with clients, customers, or end users wishing to initiate a communication in system 10 via some network. In one particular example, UE 22 reflects devices configured to generate wireless network traffic. The term 'endpoint' and 'end-station' are included within the broad term UE, as used herein. UE 22 can include devices used to initiate a communication, such as a computer, a personal digital assistant (PDA), a laptop or electronic notebook, a cellular telephone, an iPhone, a Blackberry, a smartphone, a tablet, an iPad, an IP phone, or any other device, component, element, equipment, or object capable of initiating voice, audio, video, media, or data exchanges within communication system 10. UE 22 may also include a suitable interface to the human user such as a microphone, a display, or a keyboard or other terminal equipment. UE 22 may also be any device that seeks to initiate a communication on behalf of another entity or element, such as a program, a database, or any other component, device, element, or object capable of initiating an exchange within communication system 10. Data, as used herein in this document, refers to any type of numeric, voice, video, media, or script data, or any type of source or object code, or any other suitable information in any appropriate format that may be communicated from one point to another.

Small cell 14, RNC 16, and HNB-GW 18 are network elements that can facilitate the tuning activities discussed herein. As used herein in this Specification, the term 'network element' is meant to encompass any of the aforementioned elements, as well as routers, switches, cable boxes, gateways, bridges, loadbalancers, access points of any kind (as identified herein), firewalls, inline service nodes, proxies, servers, processors, modules, or any other suitable device, component, element, proprietary appliance, or object operable to exchange information in a network environment. These network elements may include any suitable hardware, software, components, modules, interfaces, or objects that facilitate the operations thereof. This may be inclusive of appropriate algorithms and communication protocols that allow for the effective exchange of data or information.

In certain non-limiting embodiments, each network element can offer suitable connectivity to one or more wireless devices using any appropriate protocol or technique. For example, in general terms, each instance of an HNB-GW can represent an access point device that can allow wireless devices to connect to a wired network using Wi-Fi, Bluetooth, WiMAX, UMTS, or any other appropriate standard. Hence, the broad term 'network element' is also inclusive of such access point devices, which can include a wireless access point (WAP), a femtocell, a hotspot, a picocell, a WiFi array, a wireless bridge (e.g., between networks sharing same Service Set Identifier (SSID) and radio channel), a wireless local area network (LAN), or any other suitable access device, which may be capable of providing suitable connectivity to a wireless device. In certain cases, the access point connects to a router (via a wired network), and it can relay data between the wireless devices and wired devices of the network.

In one implementation, small cell 14, RNC 16, and HNB-GW 18 include software to achieve (or to foster) the tuning activities discussed herein. This could include the implementation of instances of UE attraction modules 24 and UE attraction master control module 30. Additionally, each of these elements can have an internal structure (e.g., a processor, a memory element, etc.) to facilitate some of the operations described herein. In other embodiments, these access activities may be executed externally to these elements, or included in some other network element to achieve the intended functionality. Alternatively, small cell 14, RNC 16, and HNB-GW 18 may include software (or reciprocating software) that can coordinate with other network elements in order to achieve the tuning activities described herein. In still other embodiments, one or several devices may include any suitable algorithms, hardware, software, components, modules, interfaces, or objects that facilitate the operations thereof.

Figure 2A:
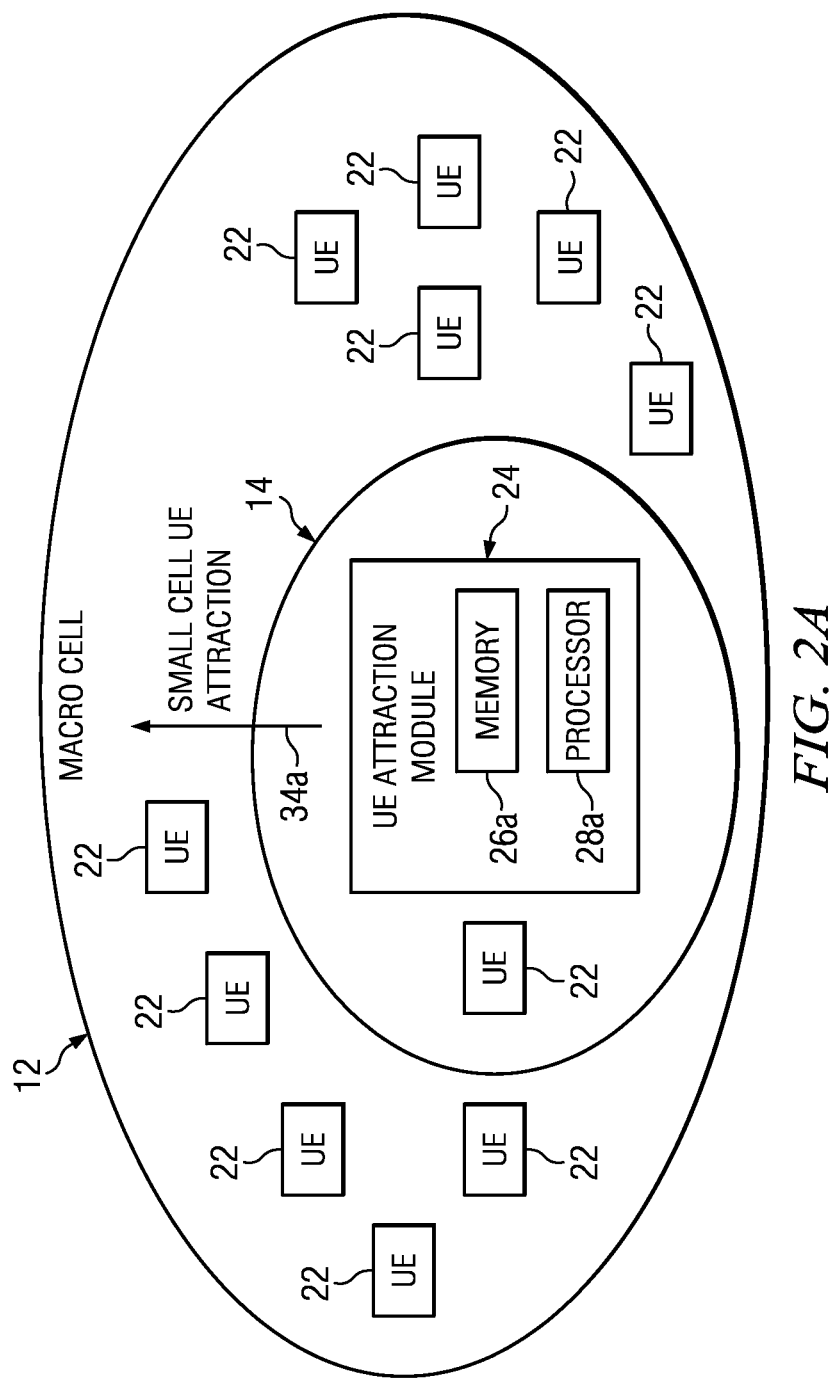
FIG. 2A is a simplified block diagram illustrating possible example details associated with communication system in accordance with one embodiment of the present disclosure.
Figure 2B:
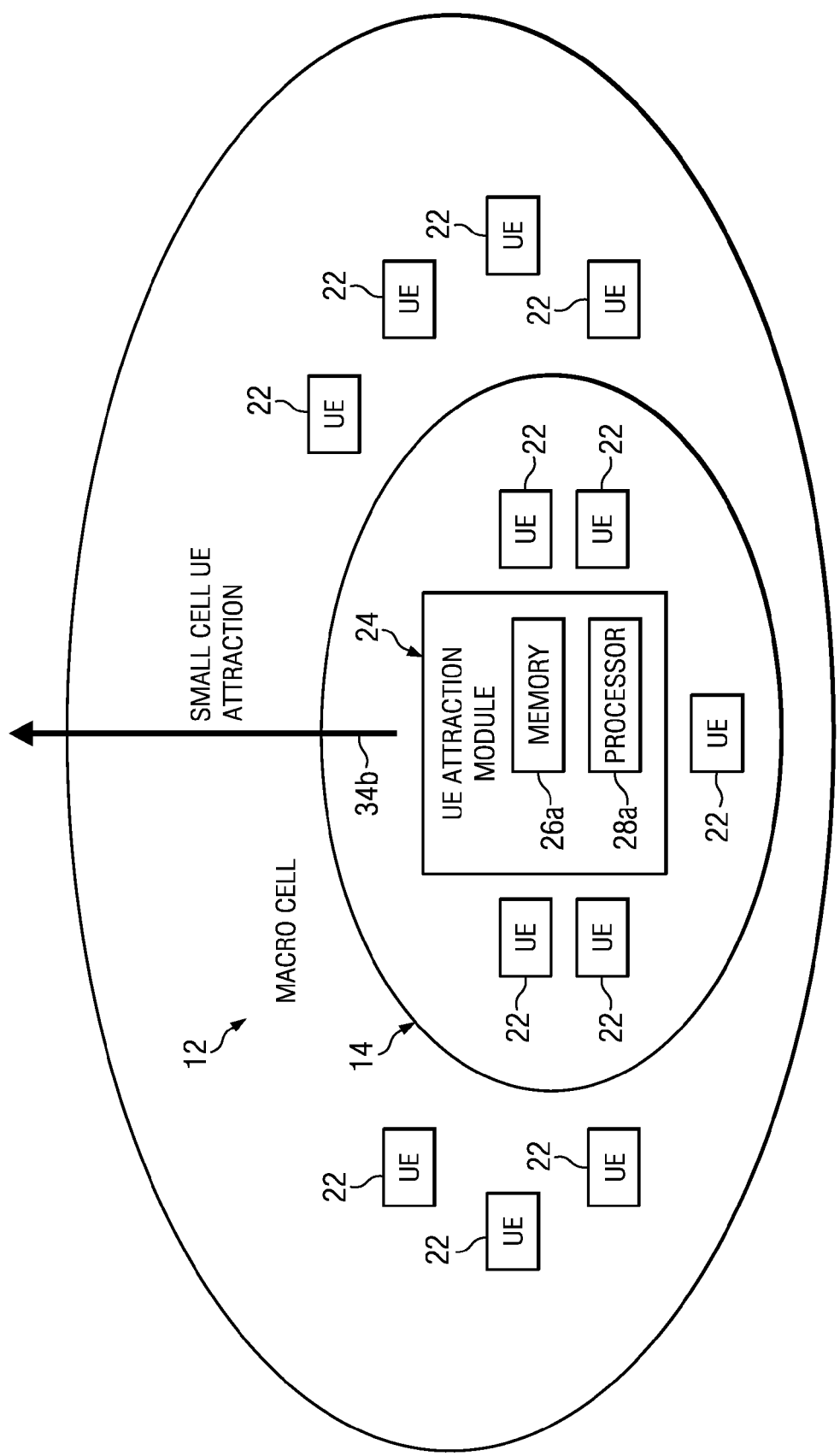
FIG. 2B is a simplified block diagram illustrating possible example details associated with the communication system in accordance with one embodiment of the present disclosure.

Turning to FIG. 2A, FIG. 2A is a simplified block diagram of an example embodiment of communication system 10, which is configured for tuning in heterogeneous networks. Communication system 10 may include macro cell 12, small cell 14, UEs 22, and a small cell UE attraction indicator 34a. Small cell 14 may include UE attraction module 24. Small cell UE attraction indicator 34*a* represents the UE attraction of small cell 14. For example, small cell UE attraction is illustrated as relatively small and, therefore, only one UE 22 is associated with small cell 14. If macro cell 12 is overloaded, then the UE attraction of small cell 14 may need to be increased to try to attract more UEs 22 and balance communication system 10. Turning to FIG. 2B, FIG. 2B is a simplified block diagram of an example embodiment of communication system 10, which is configured for tuning in heterogeneous networks. Communication system 10 may include macro cell 12, small cell 14, UEs 22, and a small cell UE attraction indicator 34*b*. Small cell 14 may include UE attraction module 24.

Small cell UE attraction indicator 34*b* represents the UE attraction of small cell 14. If macro cell 12 is overloaded, small cell UE attraction may be increased in an attempt to attract more UEs 22. More specifically, comparing UE attraction indicator 34*a* to UE attraction indicator 34*b* illustrates that the small cell UE attraction has been increased. As a result of the increase of attractiveness, as illustrated in FIG. 2B, more UEs 22 are associated with small cell 14, thereby reducing the number of UEs 22 associated with macro cell 12. Hence, the attractiveness of small cell 14 can be adjusted according to the load of macro cell 12 and/or small cell 14 to balance communication system 10.

Figure 3:
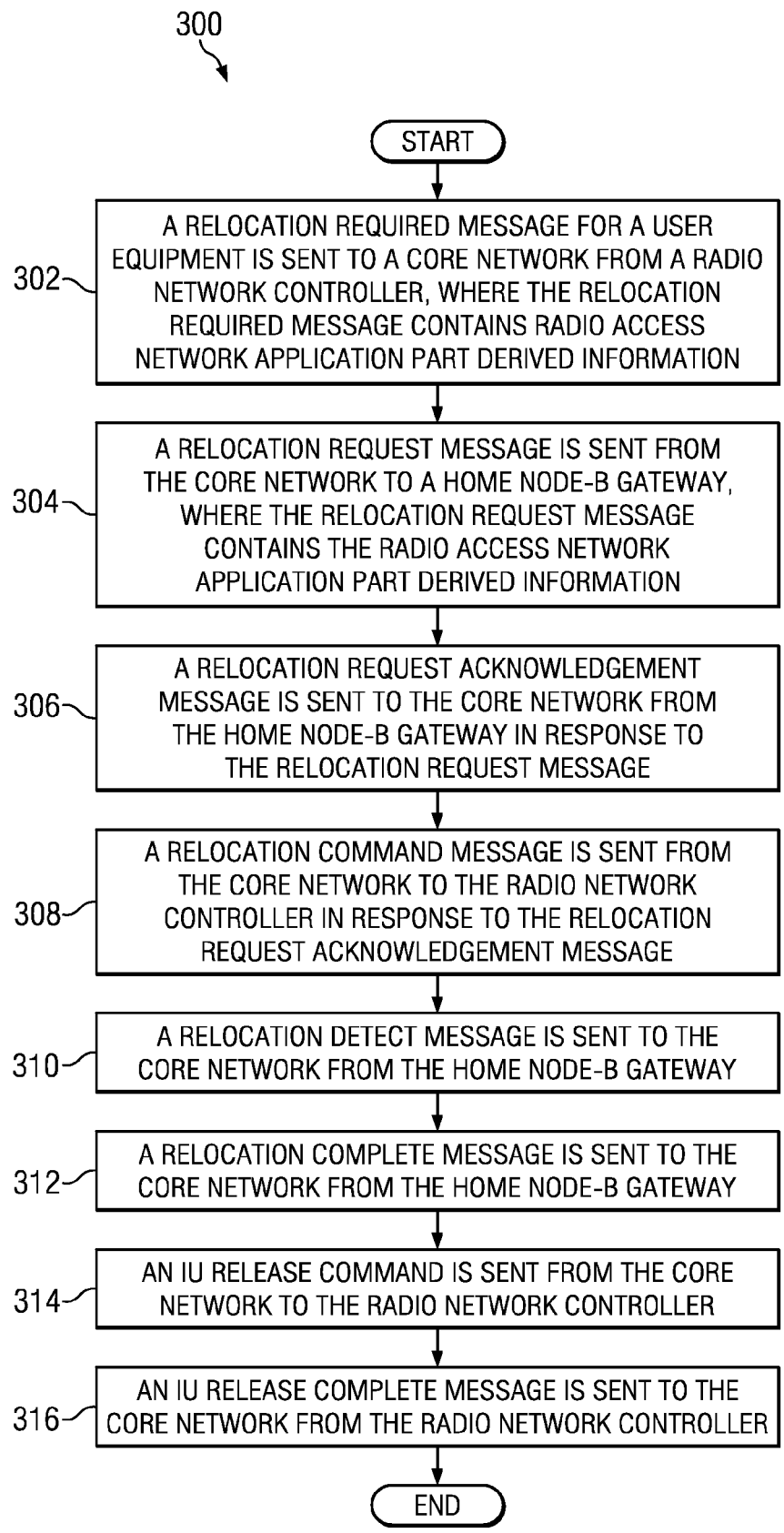
FIG. 3 is a simplified flowchart illustrating potential operations associated with the communication system in accordance with one embodiment of the present disclosure.

Turning to FIG. 3, FIG. 3 is a simplified flowchart 300 illustrating one potential operation associated with the present disclosure. In 302, a relocation required message for a UE is sent to a core network from an RNC, where the relocation required message may include RANAP derived information. For example, RNC 16 may send a relocation required message to core network 20, where the relocation required message includes RANAP derived information. In a more specific example, the RANAP derived information is cell load information for macro cell 12. [Note that while RANAP derived information is used in this particular example, other types of information (especially regarding cell load information) may be included in the message.]

In 304, a relocation request message is sent from the core network to an HNB-GW, where the relocation request message includes the RANAP derived information. For example, core network 20 may send a relocation request message to HNB-GW 18, where the relocation request message includes the RANAP derived information. In a more specific example, the relocation request message includes RANAP derived information that UE attraction module 24 can use to determine the cell load of macro cell 12.

In 306, a relocation request acknowledgement message is sent to the core network from the HNB-GW in response to the relocation request message. For example, HNB-GW 18 may send a relocation request acknowledgement message to core network 20 in response to the relocation request message. In 308, a relocation command message is sent from the core network to the RNC in response to the relocation request acknowledgement message. For example, core network 20 may send a relocation command message to RNC 16 in response to the relocation request acknowledgement message.

In 310, a relocation detect message is sent to the core network from the HNB-GW. For example, a relocation detect message may be sent to core network 20 from HNB-GW 18. In 312, a relocation complete message is sent to the core network from the HNB-GW. For example, a relocation complete message may be sent to core network 20 from HNB-GW 18. At 314, an IU release command is sent from the core network to the RNC. For example, core network 20 may send an IU release message to RNC 16. In 316, an IU release complete message is sent to the core network from the RNC. For example, an IU release complete message may be sent to core network 20 from RNC 16, thereby indicating that the handover (i.e., hand-in) is completed.

Figure 4:
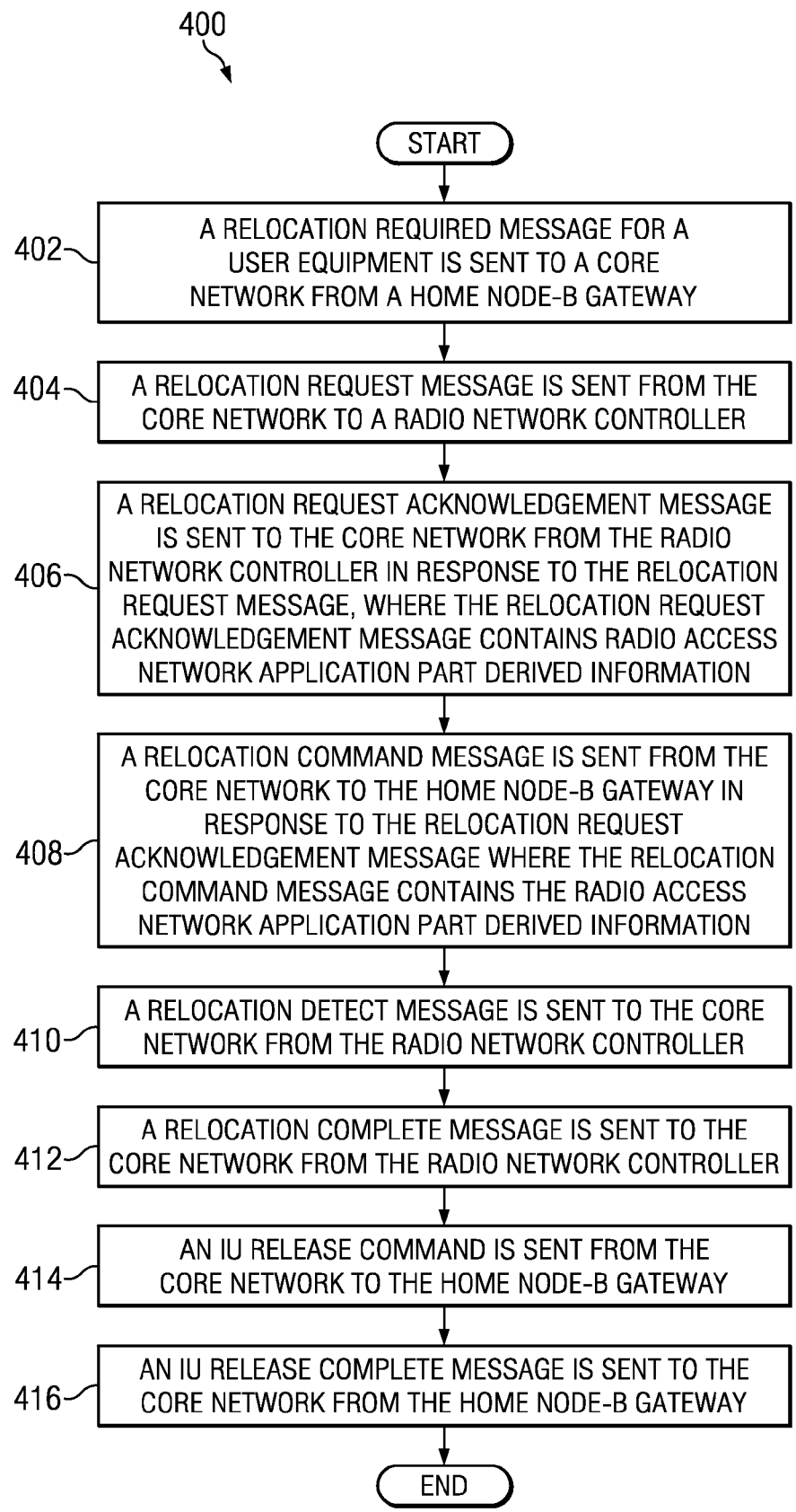
FIG. 4 is another simplified flowchart illustrating potential operations associated with the communication system in accordance with one embodiment of the present disclosure.

Turning to FIG. 4, FIG. 4 is a simplified flowchart 400 illustrating one potential operation associated with the present disclosure. In 402, a relocation required message for a UE is sent to a core network from an HNB-GW. For example, HNB-GW 18 may send a relocation required message to core network 20. In 404, a relocation request message is sent from the core network to an RNC. For example, core network 20 may send the relocation request message to RNC 16. In 406, a relocation request acknowledgement message is sent to the core network from the RNC in response to the relocation request message, where the relocation request acknowledgement message includes RANAP derived information. For example, in response to the relocation request message, RNC 16 may send the relocation request acknowledgement message to core network 20, where the relocation request acknowledgement message may include RANAP derived information. In a more specific example, the RANAP derived information is cell load information for macro cell 12.

In 408, a relocation command message is sent from the core network to the HNB-GW in response to the relocation request acknowledgement message, where the relocation command message includes the RANAP derived information. For example, in response to the relocation request acknowledgment message, core network 20 may send the relocation command message to HNB-GW 18, where the relocation command message includes the RANAP derived information. In a more specific example, the relocation command message includes RANAP derived information that UE attraction module 24 can use to determine the cell load of macro cell 12.

In 410, a relocation detect message is sent to the core network from the RNC. For example, a relocation detect message may be sent to core network 20 from RNC 16. In 412, a relocation complete message is sent to the core network from the RNC. For example, a relocation complete message may be sent to core network 20 from RNC 16. In 414, an IU release command is sent from the core network to the HNB-GW. For example, core network 20 may send the IU release message to HNB-GW 18. In 416, an IU release complete message is sent to the core network from the HNB-GW. For example, an IU release complete message may be sent to core network 20 from HNB-GW 18, thereby indicating that the handover (i.e., hand-out) is completed.

Figure 5:
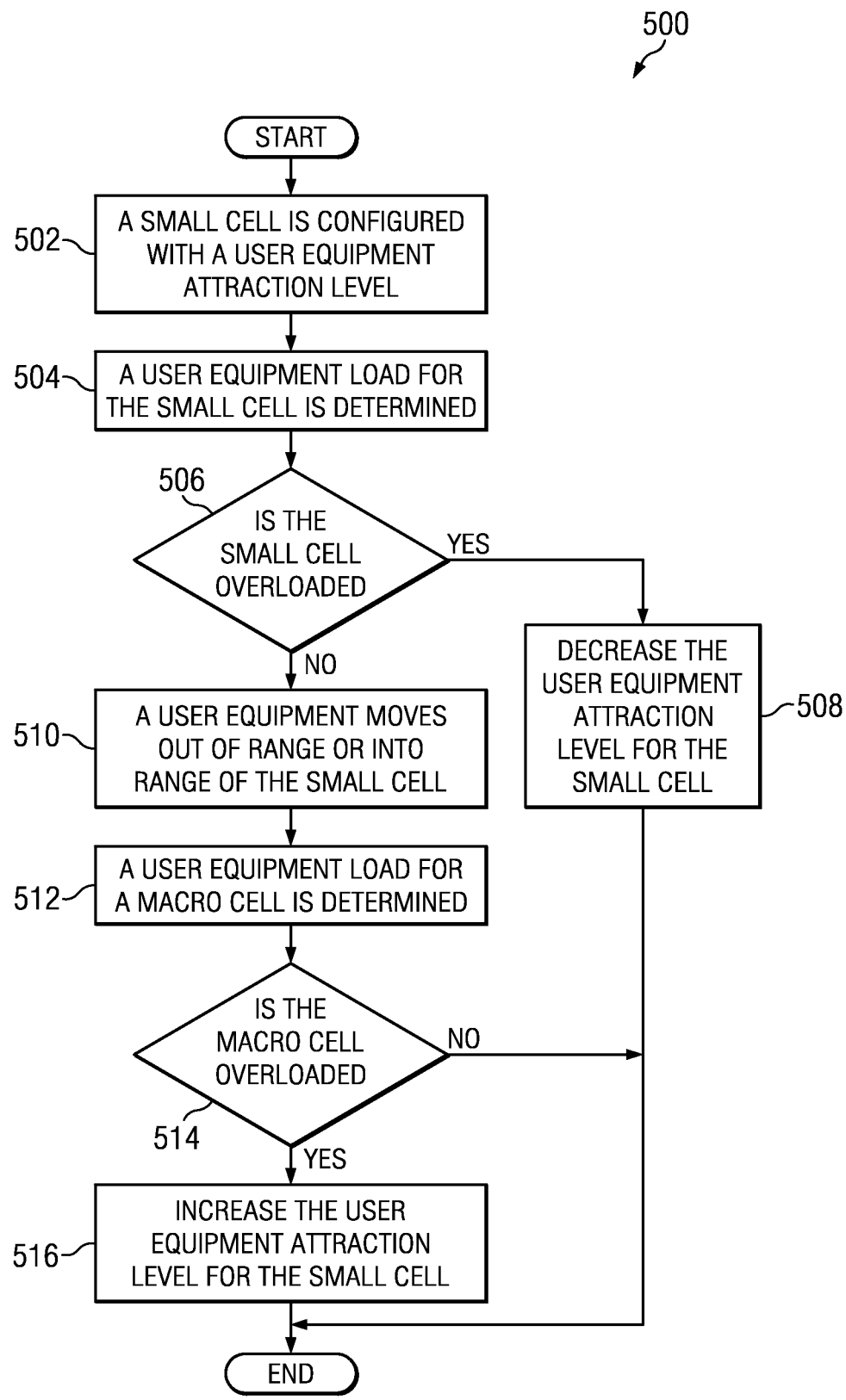
FIG. 5 is another simplified flowchart illustrating potential operations associated with the communication system in accordance with one embodiment of the present disclosure.

Turning to FIG. 5, FIG. 5 is a simplified flowchart 500 illustrating one potential operation associated with the present disclosure. In 502, a small cell is configured with a UE attraction level. For example, small cell 14 may be configured with an attraction level such as the one illustrated by the arrow of small cell UE attraction indicator 34*a*. In 504, a UE load for the small cell is determined. In 506, the system determines if the small cell is overloaded. For example, UE attraction module 24 may compare the congestion of small cell 14 to threshold values in memory 26*a* to determine if small cell 14 is overloaded (or, in an embodiment, needs to attract more UEs 22). In another example, UE attraction master control module 30 in HNB-GW 18 may compare the congestion of small cell 14*a* to threshold values in memory 26*b* to determine if small cell 14*a* is overloaded (or, needs to attract more UEs 22). In an example, UE attraction master control module 30 may determine that small cells 14*a* and 14*b* are overloaded and, further, that small cells 14*c* and 14*d* are under loaded.

If the system determines that the small cell is overloaded, then the UE attraction level for the small cell is decreased, as in 508. By decreasing the UE attraction level, fewer UEs will join the small cell, thus reducing the overload of the small cell. If the system determines that the small cell is not overloaded, then no action is taken and the attraction level for the small cell is not decreased. In the example stated above, UE attraction master control module 30 may determine that small cells 14a and 14b are overloaded and small cells 14c and 14d are under loaded. As a result, the attractiveness of small cells 14a and 14b may be decreased and the attractiveness of small cells 14c and 14d may be increased to balance the load of communication system 10.

In 510, a UE moves out of range (or into the range) of the small cell. For example, UE 22 may move out of the range of small cell 14 (or into the range) of small cell 14. In 512, a UE load for a macro cell that includes the small cell is determined. For example, a UE load for macro cell 12 that includes small cell 14 may be determined. More specifically, the UE load may be determined using information in the handover messages when the UE moved out of range (or into the range) of small cell 14. In 514, the system determines if the macro cell is overloaded. For example, UE attraction module 24 may compare the UE load for macro cell 12 to thresholds to determine the congestion of macro cell 12 and if macro cell 12 is overloaded. In another example, UE attraction master control module 30 in HNB-GW 18 may compare the UE load of macro cell 12 to threshold values to determine if macro cell 12 is overloaded. If the system determines that the macro cell is overloaded, then the UE attraction level for the small cell is increased, as in 516. For example, the UE attraction level for small cell 14 may be increased to attract more UEs 22 to small cell 14 in an attempt to reduce the load on macro cell 12. If the system determines that the macro cell is not overloaded, then the process ends. In an embodiment, the system determines if the macro cell is under loaded and if so, the system may decrease the attractiveness of the small cell to increase the load on the macro cell and reduce the load on the small cell.

As identified previously, a network element such as small cell 14, HNB-GW 18, and RNC 16 can include software to achieve the tuning operations, as outlined herein in this Specification. In certain example implementations, the tuning management functions outlined herein may be implemented by logic encoded in one or more tangible media (e.g., embedded logic provided in an application specific integrated circuit [ASIC], digital signal processor [DSP] instructions, software [potentially inclusive of object code and source code] to be executed by a processor [processor 28a shown in FIGS. 1A, 1B, 2A, and 2B and processor 28b shown in FIG. 1B], or other similar machine, etc.). In some of these instances, a memory element [memory 26a shown in FIGS. 1A, 1B, 2A, and 2B and memory 26b shown in FIG. 1B] can store data used for the operations described herein. This includes the memory element being able to store software, logic, code, or processor instructions that are executed to carry out the activities described in this Specification. The processor (e.g., processor 28a and 28b) can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by the processor) and the elements identified herein could be some type of a programmable processor, programmable digital logic (e.g., a field programmable gate array [FPGA], an erasable programmable read only memory (EPROM), an electrically erasable programmable ROM (EE-PROM)) or an ASIC that includes digital logic, software, code, electronic instructions, or any suitable combination thereof.

Any of these elements (e.g., the network elements, etc.) can include memory elements for storing information to be used in achieving the tuning activities as outlined herein. Additionally, each of these devices may include a processor that can execute software or an algorithm to perform the tuning management activities as discussed in this Specification. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein should be construed as being encompassed within the broad term 'memory element.' Similarly, any of the potential processing elements, modules, and machines described in this Specification should be construed as being encompassed within the broad term 'processor.' Each of the network elements can also include suitable interfaces for receiving, transmitting, and/or otherwise communicating data or information in a network environment.

Note that with the examples provided above, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that communication system 10 (and its teachings) are readily scalable and, further, can accommodate a large number of components, as well as more complicated/sophisticated arrangements and configurations. Accordingly, the examples provided should not limit the scope or inhibit the broad teachings of communication system 10, as potentially applied to a myriad of other architectures.

It is also important to note that the steps in the preceding FIGURES illustrate only some of the possible scenarios that may be executed by, or within, communication system 10. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 10 in that any suitable arrangements, chronologies, configurations, and timing mechanisms may be provided without departing from the teachings of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
   receiving, at a small cell in a heterogeneous network, a radio related relocation message including derived information from Radio Access Network Application Part (RANAP) messages, wherein the derived information includes cell load information for a macro cell in the heterogeneous network; and
   changing one or more self-optimizing network parameters of the small cell in the heterogeneous network to attract user equipment, when the cell load information passes a heavy load threshold.

2. The method of claim 1, wherein the derived information is provided in a relocation request acknowledgement message.

3. The method of claim 1, further comprising:
   receiving, at the macro cell, small cell derived information for a plurality of small cells in the heterogeneous network; and
   increasing a plurality of self-optimizing network parameters of the plurality of small cells in the heterogeneous network to attract a plurality of instances of user equipment, wherein the increase in the plurality of self-optimizing network parameters is based, at least, on information within the RANAP messages.

4. The method of claim 1, further comprising:
   averaging the cell load information with previously received cell load information to generate an average for a comparison to a threshold value.

5. The method of claim 1, wherein one of the one or more self-optimizing network parameters is pilot power.

6. The method of claim 1, wherein the change to the one or more self-optimizing parameters is initiated by a small cell gateway.

7. The method of claim 1, further comprising:
   determining a load associated with a particular small cell;
   comparing a congestion level of the particular small cell to a threshold value; and
   changing an attraction level associated with the particular small cell based on the comparing.

8. The method of claim 1, further comprising:
   changing the one or more self-optimizing network parameters of the small cell in the heterogeneous network to deflect user equipment, when the cell load information passes a light load threshold.

9. Logic encoded in one or more non-transitory media that includes code for execution and when executed by one or more processors is operable to perform operations comprising:
   receiving, at a small cell in a heterogeneous network, a radio related relocation message including derived information from Radio Access Network Application Part (RANAP) messages, wherein the derived information includes cell load information for a macro cell in the heterogeneous network; and
   changing one or more self-optimizing network parameters of the small cell in the heterogeneous network to attract user equipment, when the cell load information passes a heavy load threshold.

10. The logic of claim 9, wherein the derived information is provided in a relocation request acknowledgement message.

11. The logic of claim 9, the operations further comprising:
    receiving small cell derived information for a plurality of small cells in the heterogeneous network; and
    increasing a plurality of self-optimizing network parameters of the plurality of small cells in the heterogeneous network to attract a plurality of instances of user equipment, wherein the increase in the plurality of self-optimizing network parameters is based, at least, on information within the RANAP messages.

12. The logic of claim 9, the operations further comprising:
    averaging the cell load information with previously received cell load information to generate an average for a comparison to a threshold value.

13. The logic of claim 9, wherein one of the one or more self-optimizing network parameters is pilot power.

14. The logic of claim 9, wherein the change to the one or more self-optimizing parameters is initiated by a small cell gateway.

15. The logic of claim 9, the operations further comprising:
    determining a load associated with a particular small cell;
    comparing a congestion level of the particular small cell to a threshold value; and
    changing an attraction level associated with the particular small cell based on the comparing.

16. A network element, comprising:
    an attraction module;
    a memory element for storing instructions; and
    a processor coupled to the memory element and operable to execute the instructions such that the network element is configured for:
       receiving, at a small cell in a heterogeneous network, a radio related relocation message including derived information from Radio Access Network Application Part (RANAP) messages, wherein the derived information includes cell load information for a macro cell in the heterogeneous network; and
       changing one or more self-optimizing network parameters of the small cell in the heterogeneous network to attract user equipment, when the cell load information passes a heavy load threshold.

17. The network element of claim 16, wherein the derived information is provided in a relocation request acknowledgement message.

18. The network element of claim 16, the apparatus being further configured for:
    receiving small cell derived information for a plurality of small cells in the heterogeneous network; and
    increasing a plurality of self-optimizing network parameters of the plurality of small cells in the heterogeneous network to attract a plurality of instances of user equipment, wherein the increase in the plurality of self-optimizing network parameters is based, at least, on information within the RANAP messages.

* * * * *